(12) United States Patent
Pan

(10) Patent No.: US 8,616,736 B2
(45) Date of Patent: Dec. 31, 2013

(54) CIRCULAR LIGHT-REFLECTING PLATE WITH TRIANGULAR ORIENTED PRISMS HAVING IDENTICAL CROSS SECTION AND CIRCULAR PLATE LAMP MADE THEREFROM

(76) Inventor: Dingguo Pan, Shanghai (CN)

(*) Notice: Subject to any disclaimer, the term of this patent is extended or adjusted under 35 U.S.C. 154(b) by 229 days.

(21) Appl. No.: 13/060,932

(22) PCT Filed: Aug. 26, 2008

(86) PCT No.: PCT/CN2008/001534
§ 371 (c)(1),
(2), (4) Date: May 10, 2011

(87) PCT Pub. No.: WO2010/022539
PCT Pub. Date: Mar. 4, 2010

(65) Prior Publication Data
US 2011/0242821 A1 Oct. 6, 2011

(51) Int. Cl.
*F21V 7/20* (2006.01)
*F21V 7/04* (2006.01)

(52) U.S. Cl.
USPC .................... 362/345; 362/341; 362/609

(58) Field of Classification Search
USPC ......... 362/600, 606, 607, 615–626, 341–350, 362/608–610
See application file for complete search history.

(56) References Cited

U.S. PATENT DOCUMENTS

| | | | |
|---|---|---|---|
| 5,590,945 A * | 1/1997 | Simms | 362/623 |
| 6,435,687 B1 | 8/2002 | Fukiharu | |
| 6,443,582 B1 * | 9/2002 | Tarne et al. | 362/27 |
| 7,025,482 B2 | 4/2006 | Yamashita et al. | |
| 7,278,773 B2 | 10/2007 | Ha | |
| 2009/0279020 A1 * | 11/2009 | Tanabe | 349/65 |

FOREIGN PATENT DOCUMENTS

| | | |
|---|---|---|
| CN | 2499688 | 7/2002 |
| CN | 2680973 | 2/2005 |
| CN | 1924621 | 3/2007 |
| CN | 2876545 | 3/2007 |

(Continued)

OTHER PUBLICATIONS

International Search Report for international application No. PCT/CN2008/001534, dated Jun. 4, 2009 (8 pages).

*Primary Examiner* — Karabi Guharay
*Assistant Examiner* — Nathaniel Lee
(74) *Attorney, Agent, or Firm* — Hamre, Schumann, Mueller & Larson, P.C.

(57) ABSTRACT

An oriented circular light-reflecting plate with triangular micro prisms having identical cross sections and a circular plate lamp made therefrom, wherein a plurality of annular micro prism bodies (111) are arranged on the prism surface (11) of the light-reflecting plate (1), the cross sections through the central axis are triangles, which have the same shapes, the same cross sectional areas and the same distances along the diameter direction, the apex of the triangle closest to the central axial line has the shortest distance away from the smooth surface (12) of the light-reflecting plate, and the apices of the triangles towards the periphery of the light-reflecting plate have the successively increasing distances away from the smooth surface 912) of the light-reflecting plate. The circular plate lamp comprises the light-reflecting plate (1), a heat-dissipating frame (3), a reflecting back plate (5), a heat-dissipating plate (4) and lamp bodies (2), wherein the heat-dissipating frame (3) is sleeved around the light-reflecting plate 91) so as to form a gap with the cylindrical surface of the light-reflecting plate 91) and consequently constitute a lamp groove (14) to receive the lamp bodies (2).

19 Claims, 9 Drawing Sheets

(56) References Cited

FOREIGN PATENT DOCUMENTS

| EP | 0364228 | 4/1990 |
| EP | 0766037 | 4/1997 |
| JP | 04-234729 | 8/1992 |
| JP | 07-020462 | 1/1995 |
| JP | 09-146479 | 6/1997 |
| JP | 09-152360 | 6/1997 |
| JP | 09-507584 | 7/1997 |
| JP | 10-213712 | 8/1998 |
| JP | 11-102611 | 4/1999 |
| JP | 2001-229703 | 8/2001 |
| JP | 2003-272424 | 9/2003 |
| JP | 2004-134223 | 4/2004 |
| JP | 2008-066032 | 3/2008 |
| WO | 2009/100560 | 1/2008 |
| WO | 2009/003313 | 1/2009 |

* cited by examiner

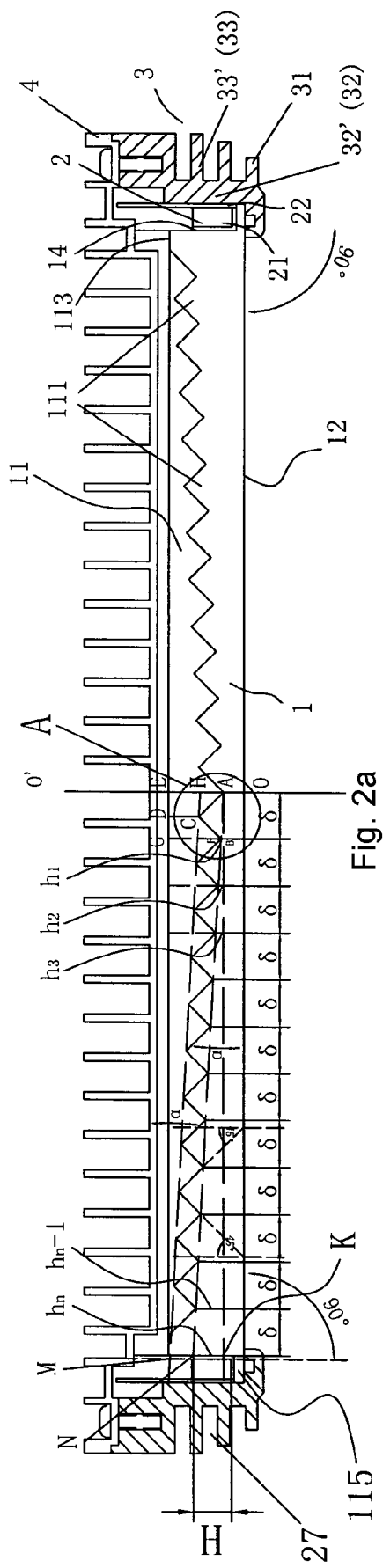
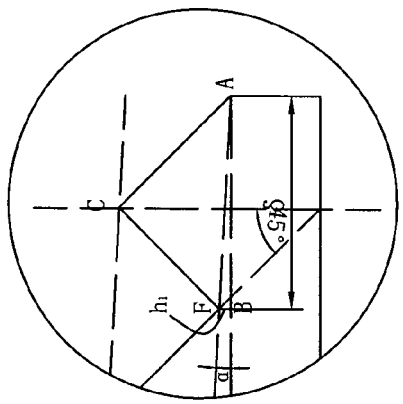
Fig. 2a
Fig. 2b

CIRCULAR LIGHT-REFLECTING PLATE WITH TRIANGULAR ORIENTED PRISMS HAVING IDENTICAL CROSS SECTION AND CIRCULAR PLATE LAMP MADE THEREFROM

TECHNICAL FIELD

This invention relates to a light-reflecting plate with micro prism, especially to circular light-reflecting plate with triangular prisms having the same cross section and the circular plate lamps and circular plate lighting fixtures made therefrom.

BACKGROUND ART

In prior art, the light-reflecting sheet or plate is mainly used for reflection and refraction of light rays. Later strip-type micro prisms are added for better reflection and refraction of the sun light and further, lighting fixtures are added at both ends to function as both luminous panel and lighting. In Chinese patent No. 200510029375.1, the applicant invented a micro prism-type sunlight reflecting plate and its regulating device, wherein the surface of the light-reflecting plate is equipped with several parallel micro prism bodies having the shape of isosceles right triangles, the vertex angle of which is 90° and the base angle is 45°. On each end face, there is blind hole to receive the LED lamp bodies. This kind of light-reflecting plate is used for rooms with glass ceiling, windows or skylights, which gives sufficient access to sunlight in winter and completely or partially reflects back the sunlight in summer. It shades from direct sunlight while ensuring adequate lamination indoors. The lamp bodies on both ends can provide additional lighting at dark weather or at night. Although the light-reflecting plate of this structure can make the overall plate to function as a luminous surface under the action of the lamp bodies, its luminance is very low due to limitation by design structure.

Inspired after the aforesaid patent, the applicant envisages how to employ the combination of light-reflecting plate and LED with lighting fixtures and starts to study on changing the point light source of the light-reflecting plate to surface light source via LED. That is to use LED for lighting other than for decoration. For this purpose, the applicant has disclosed two light-reflecting plates in PCT/CN2007/002052 and PCT/CN2008/000031. Among them, one is flat light-reflecting plate, wherein one surface is arranged with several parallel strip-type micro prism bodies, the cross sections of the left and right scalene right-angle triangles adjacent to the symmetrical central plane are the largest and the cross sections towards the left and right sides are successively decreasing. The other is a circular light-reflecting plate consisting of right-angle triangular micro prisms with the central axis as the symmetrical center, wherein several annular micro prism bodies are formed in its radial direction with its cross section and section area being the same with those of the flat one. After blind holes and lamp bodies are equipped on both ends and circumferential faces of the two light-reflecting plates, for example, circular light-reflecting plate has lamp bodies which are arranged thereon, and the emission centers of these lamp bodies are parallel to the plane of the light-reflecting plate, or pass through the apexes of the inclusion angles of the annular prism bodies on the plane of the light-reflecting plate. The light emitted from the lamp bodies will reflect from the micro prism bodies, resulting in good lighting effect.

In further studies, it has been found that the flat and circular light-reflecting plates with the above-mentioned structures show the shortcomings that the reflecting and emitting light rays on one plane from the light-reflecting plate via the prisms are non-uniform (influencing the lighting effect) and small scale of light sheets made of light-reflecting plate, that is, asymmetrical one-side micro prism layout. The above both patent applications have not addressed these problems.

LED light source must be used for lighting based on its structural characteristics, but in its development process, LED currently has its setbacks, especially in the application of high-power LED. The biggest problem is light decay. LED's use in indoor lighting is also difficult. In sum, we have little knowledge on the light characteristics of LED light source, how LED lamps can be combined with lighting fixtures and how the optical and mechanical design can be ensured for lamps and lighting fixtures. Those are the problems to be solved in the present invention.

SUMMARY OF THE INVENTION

The object of the present invention is to provide a light technology matching with LED properties so that LED can reflect and emit evenly distributed light rays on one plane of the prism of the light-reflecting plate, and to provide an oriented circular light-reflecting plate having oriented triangular prisms which have the same (equivalent) cross section, and an circular plate lamp or circular plate lighting fixture made therefrom.

The other object of the invention is to use low power and low current LED chips, instead of high-power LED so as to prevent from complicated lighting fixtures due to complicate LED heat-dissipating structure, and avoid decreasing of luminous flux due to high LED temperature resulting from high power, so that each beam of light can accurately orient its emission, transmission and reflection and the heat generated by LED chips can be quickly dissipated, thereby achieving better lighting effect.

To achieve the above-mentioned objects, the invention adopts a light-reflecting technology, called light-reflecting plate with triangular prisms having the same cross section, which constitutes the principal part of the circular plate lamp. In this light-reflecting plate, a series of triangular prisms having the same cross section are arranged outward from the center, forming a series of concentric triangular prisms having the same cross section. In the invention, a plurality of concentric annular micro prism bodies are arranged on the prism surface of the light-reflecting plate in the radial direction starting from the central axial line, the cross sections of prism bodies are triangles and continuously arranged in zigzag form in the vertical section through the central axial line, wherein that the triangles have the same shape and the same cross sectional area, the apex of the triangle closest to the central axial line has the shortest distance away from the smooth surface of the light-reflecting plate, and the apices of the triangles towards the periphery of the light-reflecting plate have the successively increasing distances away from the smooth surface of the light-reflecting plate. The radial connection lines among the apices of the triangles of the circular prism bodies are two inclined straight lines, intersecting at a point with the central axial line of the circular light-reflecting plate and forming an inclusion angle α with the smooth surface of the plate. The inclusion angle α is 45° and the distance or interval of all triangles is equal in the diameter direction.

In one embodiment of the above circular plate or lamp, the apices of the continuously zigzag-formed triangles have successively decreasing distance from the smooth surface, and the extension line of the marginal side, which is either of the right side and the left side of the triangles, intersects with the smooth surface relative to the prism surface and forms an inclusion angle ranging from 40° to 90° with the normal line thereof.

In one embodiment, the inclusion angle α of the circular light-reflecting plate is less than 10°.

In one embodiment, the triangles of the circular plate lamp are right-angle or non-right-angle triangles.

In one embodiment, the transparent plastic for the circular plate lamp is PC (polycarbonate).

In the invention, the circular plate lamp made of the circular light-reflecting plate comprises of a light-reflecting plate, a heat-dissipating frame and a plurality of lamp bodies, wherein the heat-dissipating frame comprises a plate surface with a central throughhole and a circular plate edge around the plate surface and the frame is sleeved around the light-reflecting plate so that the plate edge (wherein the throughhole is located on the surface) overlaps with the edge of the smooth surface of the light-reflecting plate, the lower part of the internal wall of the plate edge abuts with the flange of the light-reflecting plate, and the remaining part of the internal wall constitutes a gap with the cylindrical surface of the light-reflecting plate, thereby form a circular lamp groove having the same axle with the central axle; the lamp bodies comprise LED, light bulbs, electrode tubes, or prefabricated assemblies having a plurality of LEDs and are assembled in the circular lamp groove, respectively, wherein the emission plane of the LED intersects with the connection lines of the apices of the triangles and forms an inclusion angle of 90-α.

In one embodiment, the circular plate lamp comprises heat-dissipating plate, wherein the heat-dissipating plate is a circular plate, the upper surface of which is arranged with a plurality of evenly-distributed and concentric circular heat-dissipating ribs perpendicular to the plate surface and overlaps over the light-reflecting plate through the marginal part of the circular ribs with the plate edge of the heat-dissipating frame.

In one embodiment, the circular heat-dissipating ribs of the heat-dissipating plate have evenly-distributed gaps aligned in radial direction and the heat-dissipating plate is made of aluminum alloy.

In one embodiment, the circular plate lamp comprises a reflecting back sheet, wherein the reflecting back sheet has almost the same dimensions with the light-reflecting plate, which can be made of plastic, paper or metal and is installed between the light-reflecting plate and the heat-dissipating plate.

In one embodiment, the lamp bodies of the circular plate lamp are prefabricated circular lamp assemblies having a plurality of LED BONDING DIEs, resistor and circuit board and the lamp assemblies are bended into annular shape and are installed or embedded in the annular lamp groove so that the LED emission plane installed inside the lamp groove is close to or closely attached with the cylindrical surface of the light-reflecting plate of the lamp groove and forms an inclusion angle of 90-α by intersecting with the connection lines of the apices of the triangles on the cross section of the light-reflecting plate.

In one embodiment of the circular plate lamp, the heat-dissipating frame edge and its peripheral wall are arranged with several evenly distributed annular heat-dissipating ribs in the radial direction.

In one embodiment of the circular plate lamp, the side of the triangles where the triangular prism body radiates towards or the side adjacent to the light is the light-receiving side and also the marginal side where the triangle faces towards the central axis, and the circular surface where the light-receiving marginal side is located is the light-receiving marginal surface, wherein the extension line of the marginal side intersects with the smooth surface of the prism surface and forms an inclusion angle with the normal line of the smooth surface, ranging from 40°-90°.

In one embodiment of the circular plate lamp, the LED and LED BONDING DIE are dioxides and chips with low power and current, and several chips can be installed inside a LED BONDING DIE.

In one embodiment, the heat-dissipating frame and heat-dissipating plate of the circular plate lamp are made of aluminum alloy.

In one embodiment of the circular plate lamp, each of heat-dissipating plate, the reflecting back sheet and the light-reflecting plate is arranged with a central installation hole in the center.

In one embodiment, the circular plate lamp further comprises a screw socket and a constant current power supply, wherein the heat-dissipating plate is of conical shape, the apex of which is arranged on a plane and on the conical face of which are arranged with radial heat-dissipating ribs; the screw socket is installed on the plane of the conical apex; the constant current power supply is installed between the heat-dissipating plate and the reflecting back sheet by a support, the input terminal of which is connected with the screw socket and the output terminal is connected with the terminal block of the LED strip light source.

Therefore, the circular plate lamp with triangular prisms having identical cross section is an area source light-emitting engine consisting of constant current source for power driver, LED light-emitting strip-type light source, aluminum heat-dissipating frame for circular plate lamp (heat-dissipating device) and secondary optical elements of circular plate with triangular prisms having identical cross sections. The circular plate lamp is basically of circular plate structure, and when it is lit up, the light rays emit out from the circular plane wherein the driving voltage is of 12V or 24V DC and constant current ranges from dozens to hundreds of milliampere (mA). It can be made into sheet-type circular lamps with diameters ranging from dozens of millimeters to hundreds of millimeters and can thus be used for indoor lighting, such as ceiling lamps in bedrooms, washing room, and kitchens, as well as cupboard circular plate lams, and ceiling lamps for public alleys and public open spaces. The circular plate lamps can also be used as desk lamps. Further, the 1 w circular plate lamps with diameters of dozens of millimeters can be used for the senior people at night.

The circular plate lamps are flat and compact and the light emitted from the circular plane is uniform without glare. The shell temperature is often 10 degree higher than the ambient temperature. It uses 12V safe low voltage and the overall current is lower than 1000 mA, featuring long service life up to 40000 hours. Therefore, it can be widely used for indoor lighting.

Taking 4.6 w LED circular plate lamp with diameter of 190 mm as an example, the luminance at 400-500 mm is 900 Lux and 195 Lux at 1 m distance.

Just like the incandescent lamps, LED circular plate lamps have ideal and uniform light color without glare and flash, ensuring long service life.

LED circular plate lamps are a kind of energy-saving lamp, which can have the same luminance with the incandescent lamps at just 1/10 power compared with the incandescent lamps.

LED circular lamps are simple in structure, easy for use, safe in transport and environment-friendly for its materials and they can be recycled. LED sheet-type circular lamps can facilitate our life, work and study while ensuring highly efficient energy conservation.

BRIEF DESCRIPTION OF THE DRAWINGS

FIG. 2a and FIG. 2b are the sectional view of the circular plate lamp with triangular prisms having the same cross section and the enlarged view of A.

DETAILED DESCRIPTION OF THE INVENTION

Figure 1A:
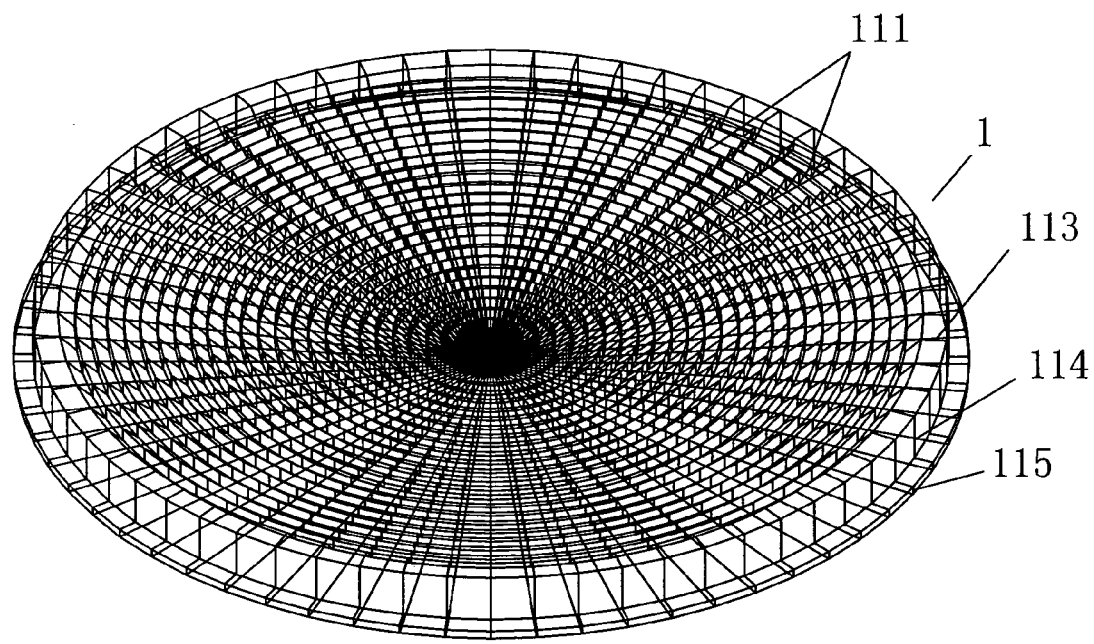
FIGS. 1a and 1b are perspective views of the light-reflecting plate with triangular prisms having the same cross section and the circular plate lamp made therefrom.

Referring to FIG. 1a to FIG. 2b, FIG. 1 shows the first embodiment the circular light-reflecting plate with triangular micro prism having identical cross section of the invention. A plurality of concentric annular micro prism bodies 111 are arranged on one surface of the prism surfaces 11 of the light-reflecting plate 1 starting from the symmetrical center OO', and the cross section of each micro prism body 111 is of triangle, including right-angle and non-right-angle triangles, wherein the triangles are arranged in continuous zigzag form and have the same cross sections and the apex of the left and right triangles adjacent to the symmetrical center has the shortest distance away from the another surface (or the smooth surface) 12 of the light-reflecting plate in its vertical direction and the vertical distance from the apexes towards the left and rights sides to the another surface of the light-reflecting plate are gradually increases (the tow sides of the central plane of central axis are symmetrical and therefore the vertical distance of the left side is taken as an example), and all triangles have the same distance δ in their length direction. Therefore, the overall width of the triangular prism body is 2n×δ, wherein n refers to the number of concentric annular triangular prism bodies on one side of the symmetrical central plane. Moreover, in this invention, the light-reflecting plate can also connect the apexes of the triangles close to the smooth surface 12 and the apexes of the triangles far away from the smooth surface 11 to form two straight lines or connect the two planes (with the left side of the central axis as an example), in addition to two preset planes, namely the smooth surface 12 and the prism surface 11 of the zigzag-arranged triangles. The two straight lines is inclined but parallel and intersect with the central axial line OO' of the cross section of the light-reflecting plate at Points A and H to form AN and HM, which form an inclusion angle α (α<45°) with the smooth surface 12. The circular light-reflecting plate of the invention can be made of transparent plastic, such as PC (Polycarbonate).

In addition, for the purpose of design, we have introduced the concept of marginal edge in this application. That is, either of the right and left sides of each triangle towards the direction where the distance from the apex of the zigzag-arranged triangles to the smooth surface is gradually decreasing is called marginal edge, the extension line of which intersects with the smooth surface relative to the prism surface and forms an inclusion angle ranging from 40° to 90° with the normal line.

In the invention, when the circular plate lamps are made from the aforesaid light-reflecting plates with different triangles having identical cross section, heat dissipating frame and lamp bodies, we will explain how the circular plate lamps made therefrom reflect and refract under LED irradiation as follows.

Figure 1B:
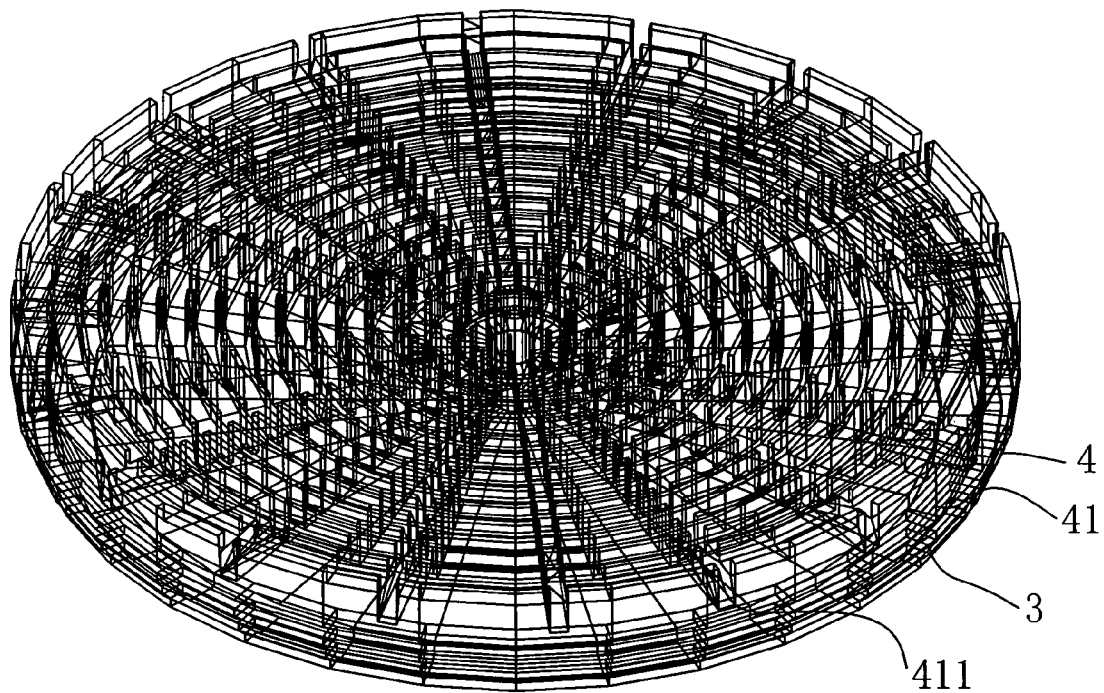

Refer to FIG. 1a and FIG. 1b. The circular plate lamps of the invention consist of circular light-reflecting plate 1, several lamp bodies 2 and heat-dissipating frames 3, wherein the light-reflecting plate 1 has outward-extending edge 113 outside the circular micro prism body farthest to the central axial line OO'. The edge 113 remains with partial cylindrical surface 114 on its peripheral surface and in addition, has circular flange 115 at place adjacent to the smooth surface 12 under the cylindrical surface 114.

The heat-dissipating frame 3 consists of a plate surface 31 with a central throughhole and a circular plate edge 32 around the plate surface, as shown in FIG. 2a. The frame is sleeved around the light-reflecting plate so that the edge of the throughhole of the plate surface overlaps with the edge 113 of the smooth surface of the light-reflecting plate and abuts with the flange 115 through the bottom of the internal wall of the plate edge 32 of the heat-dissipating frame and the remaining part of the internal wall forms a gap with the cylindrical surface 114 of the light-reflecting plate to create a circular groove having the same axle with the central axial line OO', namely, the lamp groove 14. Preferably, several evenly-distributed circular heat-dissipating ribs can be arranged on the external wall of the plate edge 32 of the heat-dissipating frame to form heat-dissipating groove 27 among the ribs. The heat-dissipating frame 3 can be made of aluminum alloy materials to ensure good heat-dissipating effect.

In a preferred embodiment, heat-dissipating frame 3 is an independent element made of aluminum alloy, with heat-dissipating ribs 33' arranged on its external wall. When sleeved onto the light-reflecting plate, the bottom of the internal wall abuts with the flange 115 of the light-reflecting plate and the remaining part of the internal wall forms a gap with the cylindrical surface 114 of the light-reflecting plate to create a circular groove having the same axle with the central axial line OO'. Part of the heat-dissipating circle 32' is also made of aluminum alloy.

The lamp body 2 is an LED, wherein the bulb, or electrode tube or prefabricated LED assemblies are installed in the circular lamp groove 14. The emission plane of the LED intersects with the apex of the triangle on each cross section to form an inclusion angle of 90-α.

In this embodiment, the lamp body 2 uses prefabricated LED assembly, which is a circular lamp assembly consisting of several LED bonding dies 21, resistor and circuit board 22. The LED bonding dies 21 are evenly arranged on the circuit board 22, wherein the lamp body is changed into circular shape by bending the circuit board and is installed or embedded in the lamp groove 14 so that the emission plane of LED bonding die 21 is close to the cylindrical surface 113 of the light-reflecting plate of the lamp groove 14 and intersects with the connection lines of the apexes of the triangles on the cross sections of the light-reflecting plate to form an inclusion angle of 90-α.

The main axle of the light rays emitted by the LED bonding dies 21 (LED in general) installed in the lamp groove 14 is a beam of light parallel to the smooth surface 12 of the light-reflecting plate. When there are n triangular prism bodies having identical cross section on one side of the central axis of the light-reflecting plate 1 and the area for each LED boding die 21 will be A, then the LED area A is divided into n equal parts equivalent to the number of the prism body 111. If the total photon energy provided is E, then the sufficient photon energy distributed to each equal area division is E/A/n so that each prism body 111 on the prism surface 11 can be illuminated evenly. The LED bonding dies used for this invention are low-power tubes and several chips can be arranged with one LED boding die. The multi-chip LED bonding dies are lined up in matrix form and installed in the lamp groove 14.

Mathematic expression is used herein to illustrate the optical features of the triangular prism bodies having identical cross section. The inclusion angle α formed by the two straight lines AN and HM with the smooth surface can be obtained by drawing parallel lines on the smooth surface through Points A and M (inclusion angle α). Usually, the inclusion angle α is less than 10°. The two straight lines are AK and ME, as indicated in FIG. 2. Suppose to take parallel line AK as an example, the first triangle FCA on the cross section of the prism body alongside the central axle is a non-isosceles right angle triangle. The vertical line from Point F (apex of the adjacent triangles) to the parallel line is FB, which functions as the squared edge of the right angle triangle, indicated by $h_1$. A series of squared edges $h_2, h_3 \ldots h_{n-1}$, and $h_n$ can be obtained by drawing vertical lines with the parallel line AK from the $2^{nd}$ to n apex of the adjacent triangles, and therefore, $h_1, h_2, h_3 \ldots h_{n-1}$, and $h_n$ indicate the vertical distance from the asymmetrical central axle to the apexes of the 1-n triangles on one side. BA is a section of the sectional triangle on the parallel line AK and also functions as another squared edge, and is equal to the gap δ of the sectional triangle in the length direction. Therefore, from the formula $$tg\alpha = \frac{FB}{AB} \text{ or } tg\alpha = \frac{a}{n \times \delta},$$

the vertical distance $h_1$ from the apex of the triangle adjacent to the first right triangle on one side of the central axle to the parallel line AK can be obtained. For FB=$h_1$, BA=δ, then $h_1$=δ×tgα. Similarly, it is available to obtain the vertical distance $h_2, h_3 \ldots h_{n-1}$, and $h_n$ from the apexes of the triangles adjacent to the $2^{nd}$ to No. n right angle triangles to the parallel line AK. For example, the No. n triangle on one side of the central axle is $$tg\alpha = \frac{hn}{n \times \delta},$$

wherein hn is the vertical line made from the apex of the No. n adjacent sectional triangle to the parallel line AK, and H is the height or diameter of the LED bonding die. Usually, hn is equal to H so that the LED bonding die can irradiate the light-receiving marginal surface of each triangle in its height direction via the vertical distance of the apex of the adjacent triangle functioning as the main axle passage of the emitted light beams and provide adequate photon energy.

Figure 3A:
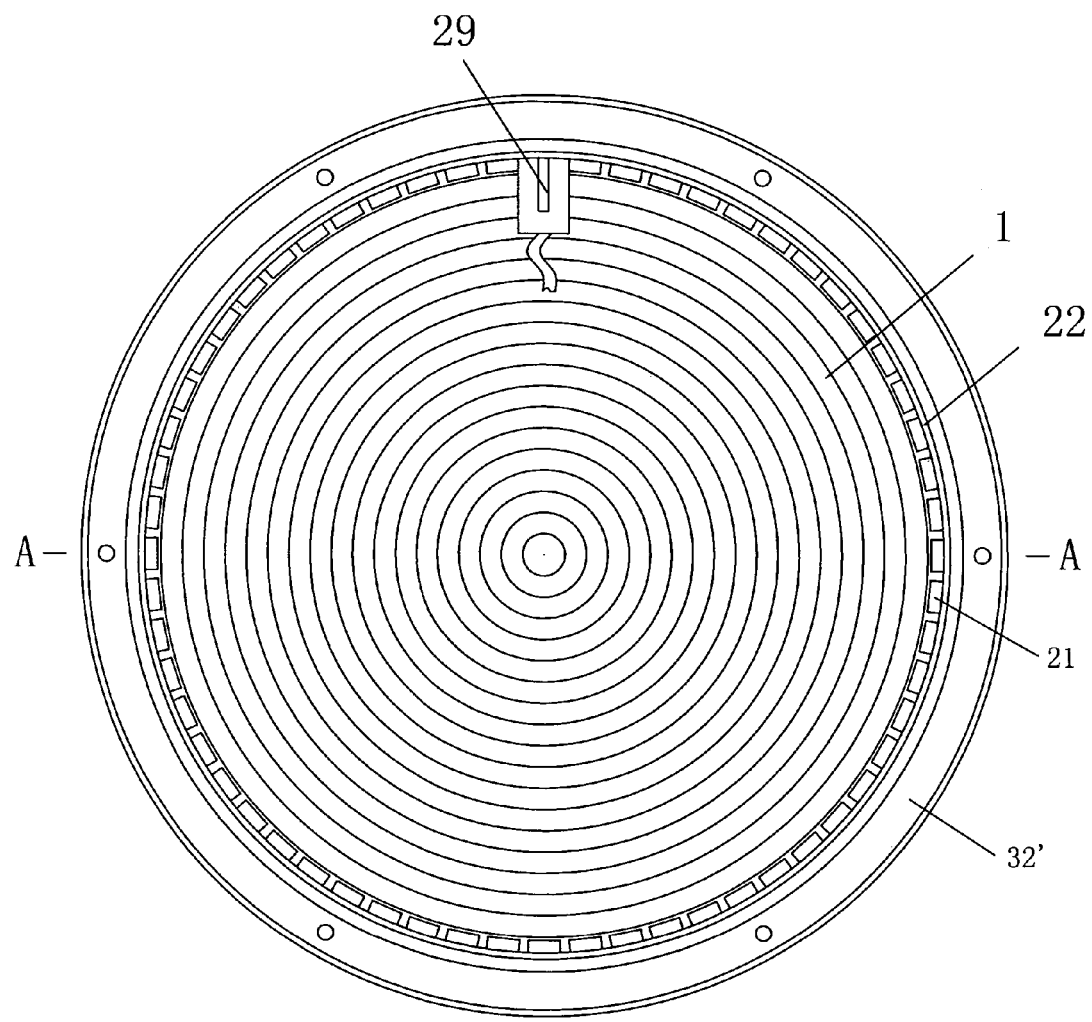
FIG. 3a is the front view of the circular plate lamp, showing the part after the removal of the heat-dissipating plate.
Figure 3B:
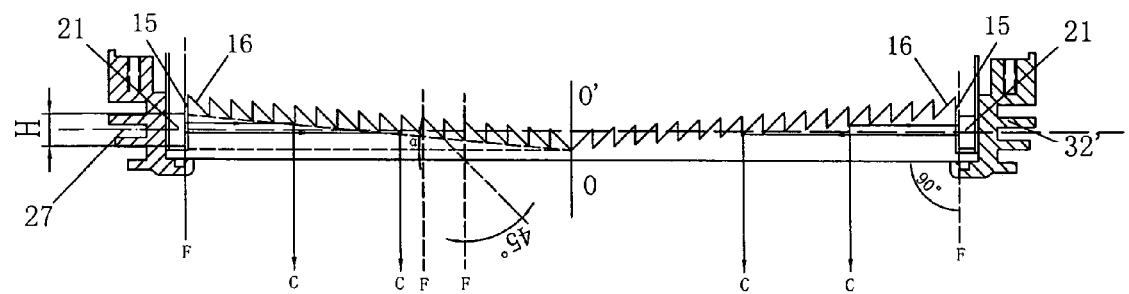
FIG. 3b is the sectional view along A-A in FIG. 3a, showing a prism body design structure of the prism surface of the circular plate lamp and optical path analysis under LED exposure.
Figure 4A:
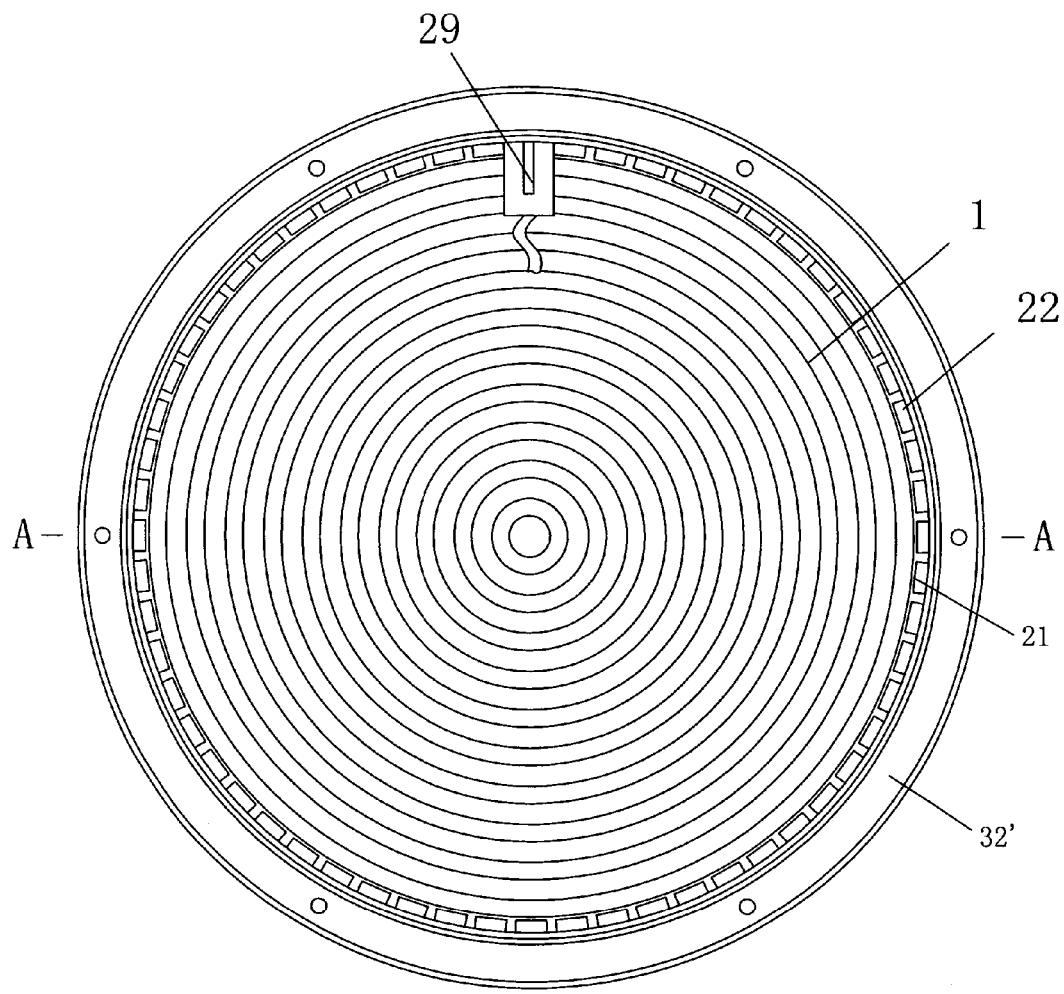
FIG. 4a is the front view of No. 2 circular plate lamp, showing the part after removal of the heat-dissipating plate.
Figure 4B:
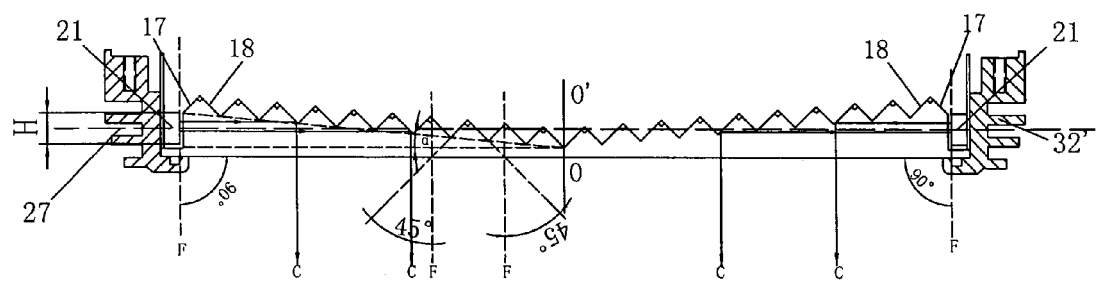
FIG. 4b is the sectional view along A-A in FIG. 4a, showing another prism body design of the prism surface of the circular plate lamp and the optical path analysis under LED exposure.
Figure 5A:
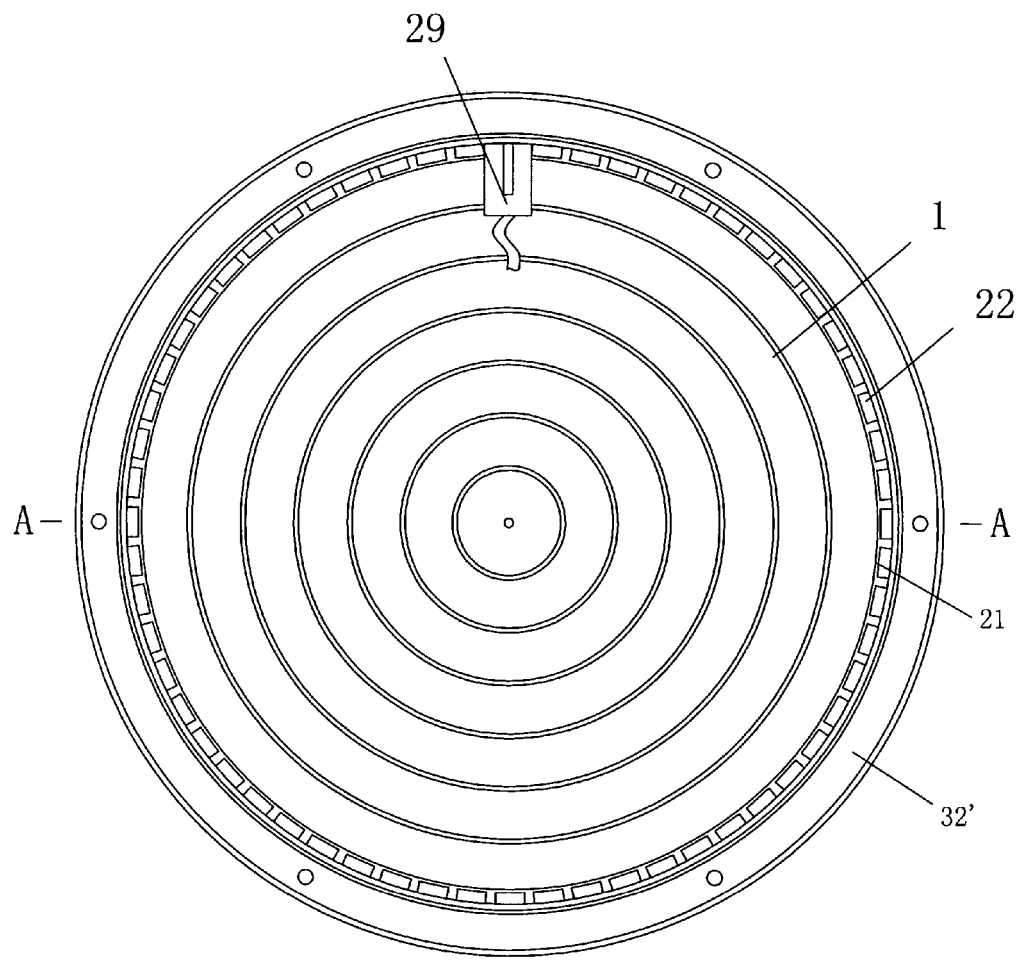
FIG. 5a is the front view of the No. 3 circular plate lamp, showing the part after removal of the heat-dissipating plate.

Refer to FIG. 3 to FIG. 5. Among them, FIG. 3a, FIG. 4a and FIG. 5a show that there are two terminals 29 equipped with the circular plate lamp and the light-reflecting plate 1 has a receptacle respectively on the end face of the edge 13 outside the lamp groove, wherein the terminals 29 are respectively installed in the receptacles and electrically connected with the leading wire of the strip-type lamp assembly 2 so that external power supply can be connected with the terminals 29. In fact, FIGS. 3 to 5 illustrate the design of the triangles having identical cross section and symmetrical in the center of the circular plate lamp. First, FIG. 3a and FIG. 3b show that the triangle having identical cross section of one of the circular plate lamps is a 45° triangle, wherein the two triangles arranged left and right of the central axis OO' have respectively outward-going vertical squared edges 15 (from which the LED light irradiates into the edge or surface of the prism) and inward-going inclined edges. These inclined edges face towards the LED irradiation direction (LED optical axis) or are adjacent to the light, and therefore, they are defined as marginal edge (marginal surface) or light-receiving marginal edge (or marginal surface) 16. For these light-reflecting plates having identical triangular cross sections, the normal line of each right-angled triangular prism body intersects with the extension line of the light-receiving marginal edge and forms an inclusion angle of 45°.

FIG. 4a and FIG. 4b show that the triangle having identical cross section of the second circular plate lamp is non-isosceles right-angled triangle, wherein the two right-angled triangles arranged on the right and left of the central axis OO' are two squared edges facing inward and outward respectively. Among them, the outward-facing edges or surfaces, namely the edges from which the LED light irradiates through the prism, are defined as irradiation squared edge 17 and the facing inward squared edges in the direction of the irradiation direction of LED (LED optical axis) are defined as marginal edges or light-receiving marginal edges 18. For these light-reflecting plates having non-isosceles right-angled triangles, the normal line F of each right-angled triangular prism body intersects with the extension line of the light-receiving marginal edge 18 and forms an inclusion angle of 45°.

Figure 5B:
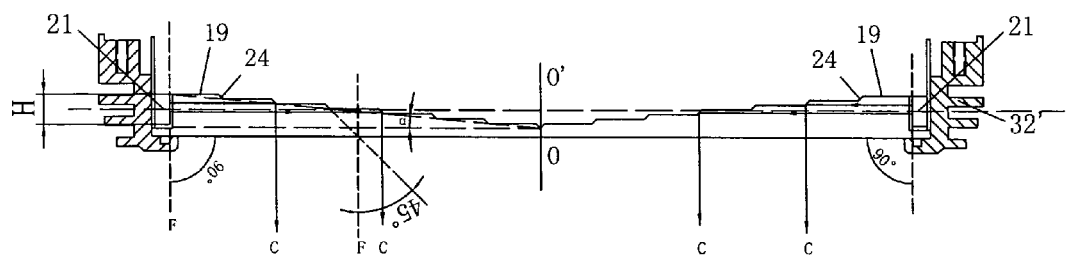
FIG. 5b is the sectional view along A-A in FIG. 5a, showing another prism body design of the prism surface of the circular plate lamp and the optical path analysis under LED exposure.
Figure 6:
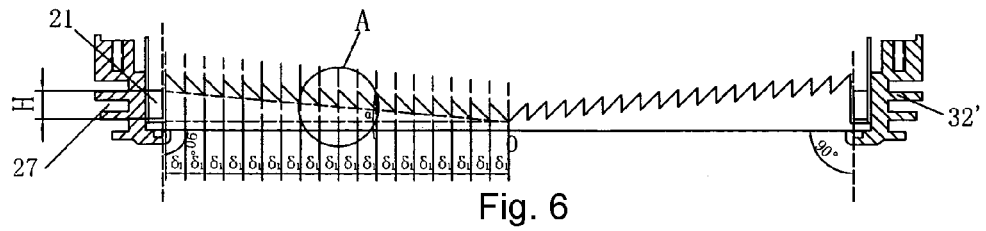
FIG. 6 is the view showing the gaps among the triangular prism bodies alongside the central axis in the diameter direction and the relationship of the inclusion angles formed between the connection line of the apex of the adjacent triangle and the horizontal line.
Figure 7:
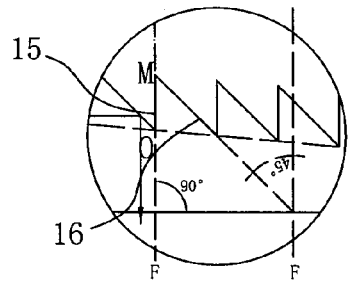
FIG. 7 is the enlarged A view of FIG. 6, showing that the light-receiving marginal face of the prism body is the side of the right-angle triangle and intersects with the normal line of the prism to form an inclusion angle of 45°.

FIG. 5a and FIG. 5b show that the triangle having identical cross section of the $3^{rd}$ circular plate lamp is non-right-angled triangle, wherein the two triangles arranged on the left and right side of the central plane of the central axis OO' have two triangular edges 19 and 24 having different length facing inward and outward respectively. These outward-facing short edges face towards the LED irradiation direction and are defined as marginal edges or light-receiving marginal edges 24. For this kind of light-reflecting plate having identical triangular cross sections, the normal line F of each triangular prism body intersects with the extension line of the light-receiving marginal edge 24 and forms an inclusion angle of 45°.

It can be seen from FIG. 3 to FIG. 5 that how the aforesaid circular plate lamps ensure oriented lighting. If the normal line of each triangular prism body in these kinds of light-reflecting plates having identical triangular cross sections intersects with the extension line of the light-receiving line and forms an inclusion angle of 45°, then the circular plate lamp with triangular prisms having identical cross section generates can emit the light c which is parallel to the normal line of the smooth surface 12 of the circular plate lamp.

The circular plate lamps made of the aforesaid light-reflecting plates having triangles of different cross sections can emit light from the smooth surface at certain angle and can be concentrated to form oriented lighting. Therefore, the term "oriented lighting" refers to the combination of the emitting lights from the light-reflecting plate with triangular prisms having identical cross section and installed with LED, which form inclusion angles with the normal line of the prism plane. Any of the circular plate lamps with triangular prism having identical cross section in FIG. 3 to FIG. 6 can emit light which forms an oriented inclusion angle with the normal line of the smooth surface. Therefore, as one-spot light source, either the LED bonding die 21 or multi-chip LED bonding die can emits lamplight to n triangular prism bodies having identical cross section respectively. Then it forms a strip-type emitting light after being reflected and refracted by the light-receiving marginal edge and smooth surface. A plurality of strip-type emitting light from the LED bonding dies are closely arranged and distributed on the overall surface to form a surface irradiation light having high luminance. This illustrates the main principles why the circular plate lamp of the invention can be used to replace the traditional incandescent and fluorescent lamps.

Please refer to FIG. 6 to FIG. 11, showing that the common points for the three circular plate lamps with triangular prisms having identical cross section are that the extension lines 16, 18 and 24 of the light-receiving marginal surfaces or edges all intersect with the normal line of the smooth surface 12 and form an 45° inclusion angle and generate emitting light beams parallel to the normal lines of the smooth surface. Analysis has shown that the inclusion angle between the extension line of the light-receiving marginal surface of the triangular prism having identical cross section shown in these figures and the normal line of the smooth surface of the prism is 45°, which is common to the circular plate lamps with triangular prisms having identical cross section. The light generated by these circular plate lamps is parallel to the normal line of the smooth surface, as shown in FIGS. 3, 4 and 5.

Figure 8:
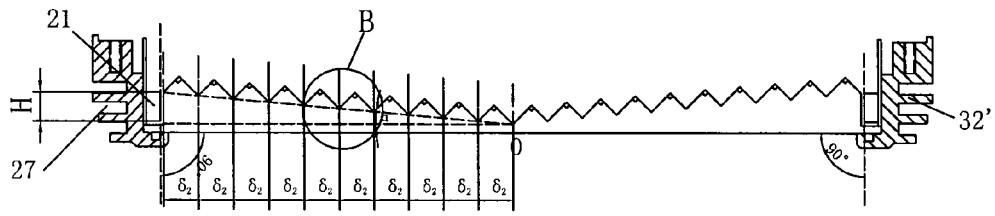
FIG. 8 is the view showing the gap among the triangular prism bodies in their diameter direction on one side of the central axis of the circular plate lamps in FIG. 4b and the relationship between the connection lines of the apexes of the adjacent triangles and the horizontal lines.
Figure 9:
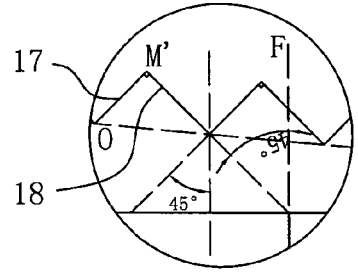
FIG. 9 is the enlarged B view of FIG. 8, showing that the light-receiving marginal face of the prism body is right-angle triangle and intersects with the normal line of the prism to form an inclusion angle of 45°.
Figure 10:
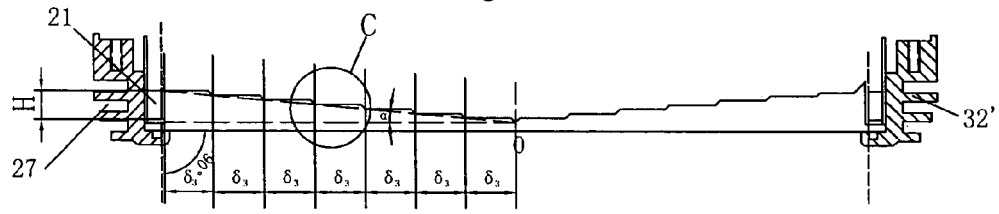
FIG. 10 is the view showing the gap among the triangular prism bodies in their diameter direction on one side of the central axis of the circular plate lamps in FIG. 5b and the relationship between the connection lines of the apexes of the adjacent triangles and the horizontal lines.
Figure 11:
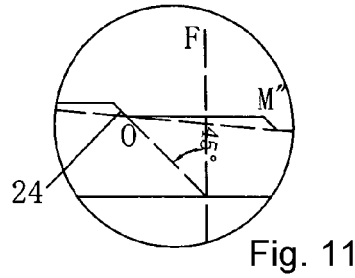
FIG. 11 is the enlarged C view of FIG. 10, showing that the light-receiving marginal face of the prism body is right-angle triangle and intersects with the normal line of the prism to form an inclusion angle of 45°.

FIG. 8 is the partially enlarged drawing of the prism body. In this figure, one of the vertical surface or edge OM (15) of the triangular prism is the squared edge from which the LED light passes through the prism and the distances of the right-angled triangles are $\delta 1$ respectively in their length direction. FIG. 10 shows the squared surface or edge OM' (17) from which the LED light from the right-angled triangular prism passes through the prism and the distances of the right-angled triangles are $\delta 2$ respectively in their length direction. FIG. 11 shows the squared surface or edge OM'' from which the LED light from the right-angled triangular prism passes through the prism and the distances of the right-angled triangles are $\delta 3$ respectively in their length direction. Therefore, it must be noted that among these prism bodies, the distance of the triangles of the light-reflecting plate shown in FIG. 7 in its length direction is $\delta 1$ which is the shortest on the light-reflecting plates with same width to ensure that the triangular prisms having identical cross section have the same area, whether they are right-angled or non-right angled triangles. The triangles on the light-reflecting plate shown in FIG. 11 have the longest distance of $\delta 3$ in their length direction. However, the right-angled triangles of the light-reflecting plates shown in FIG. 9 have the distance of $\delta 2$ in their length direction, which lies between $\delta 1$ and $\delta 3$. Therefore, a plurality of triangular prism edges can be arranged on the light-reflecting plate of FIG. 7, while fewer triangular prism edges can be arranged on the light-reflecting panel shown in FIG. 11. Accordingly, for the light-reflecting sheet with the same width, the more the triangular prism edges are, the more the outgoing light rays and the stronger the light rays will be, and vice versa.

Please also refer to FIGS. 3b, 4b and 5b. It can be seen from these figures that LED bonding die 21 is precisely oriented in the lamp groove 14 and the optical axis of the LED bonding die is parallel to the plane of the circular plate lamp. The parallel light beams emitted from LED bonding die irradiates on the marginal point of the triangular prisms arranged in sequence, which passes out the smooth surface of the prism after total reflection to form an oriented lighting parallel to the normal line of the smooth surface.

In the invention, low-power and low-current LED bonding dies are used. The PN junction of LED generates heat at 80% working current. To ensure long-time LED operation, PN junction must be operated at low temperature and the heat generated by PN junction must be removed promptly. Aluminum alloy with good heat conductivity is used for the edges relative to the outward direction of the lamp groove of the light-reflecting plate (these edges are also the frame of the lighting fixtures). Therefore, heat-dissipating frame 3 made of aluminum alloy is arranged at the edge to ensure good heat conductivity.

Figure 16:
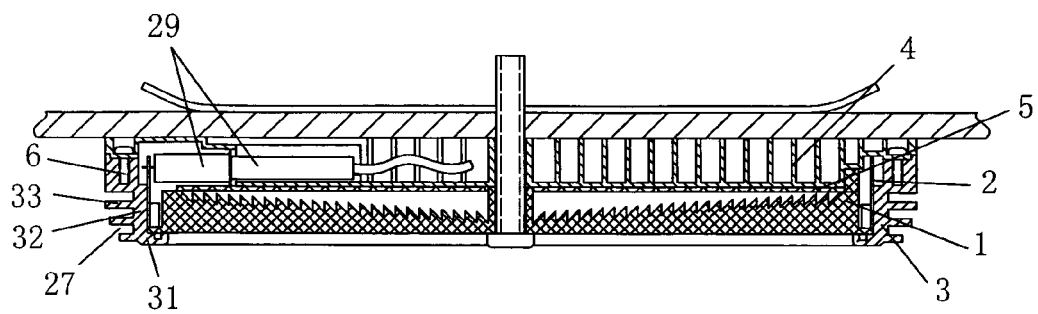
FIG. 16 is the circular plate lighting fixtures made of the circular plate lamps of the invention.

Please also refer to FIGS. 1a, 2a and 16, wherein another embodiment of circular plate lamp of the invention is shown, which consists of the heat-dissipating plate 4 and or reflecting back sheet 5, in addition to the circular light-reflecting plate 1, a plurality of lamp bodies 2, and heat-dissipating frame 3. The said heat-dissipating plate 4 is a circular plate like a cover. Preferably, a plurality of evenly distributed concentric annular heat-dissipating ribs 41 are arranged on the surface of the circular plate, which is connected with the plate edge of the heat-dissipating frame via its edge, including screw 6 and is covered over the light-reflecting plate. The annular heat-dissipating ribs 41 of the heat-dissipating plate 4 conduct the heat emitted from the lamp body 2. A heat-dissipating groove is formed among the heat-dissipating ribs so as to ensure air circulation and spread the heat from the center. In addition, a plurality of evenly distributed gaps 411 are arranged on each of the annular heat-dissipating ribs 41 of the heat-dissipating plate 4. Preferably, these gaps are arranged in line so that the heat can be better diffused out of the lamps and the heat-dissipating plate is made of aluminum alloy. The reflecting back sheet 5 has the dimension similar to that of the light-reflecting plate, and can be made by plastic, paper or metal material, and is installed between the light-reflecting plate 1 and the heat-dissipating plate 4.

Figure 12:
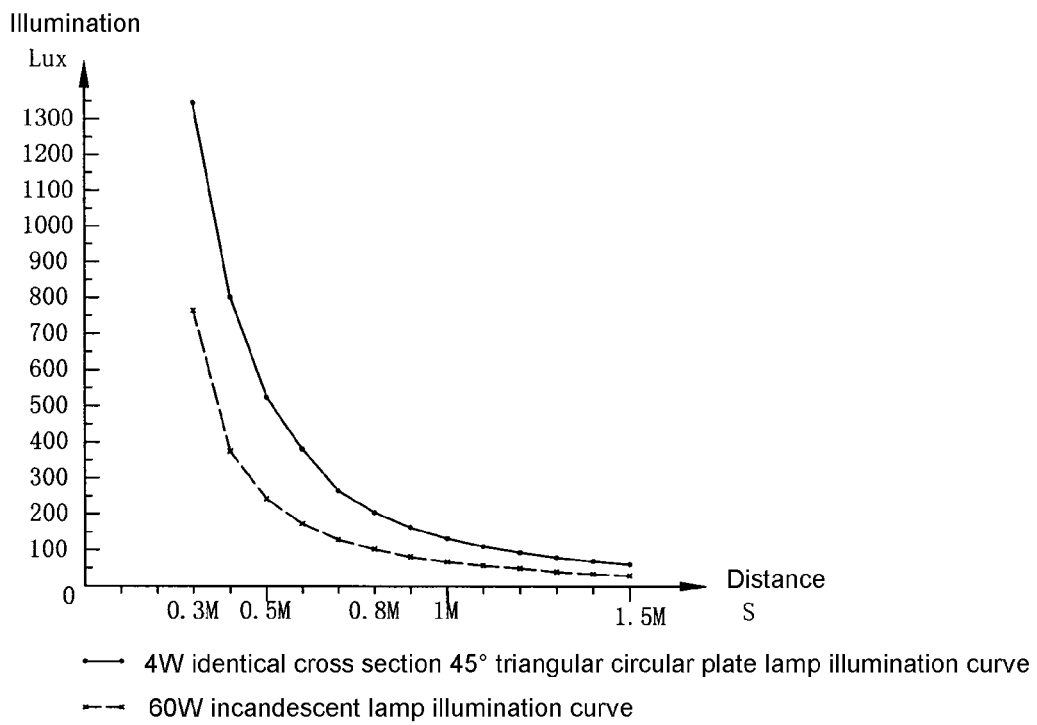
FIG. 12 is the curve graph comparing the luminance of the 4 w circular plate lamp of the present invention with 60 w incandescent lamps at 0-1.5 m distance.
Figure 13:
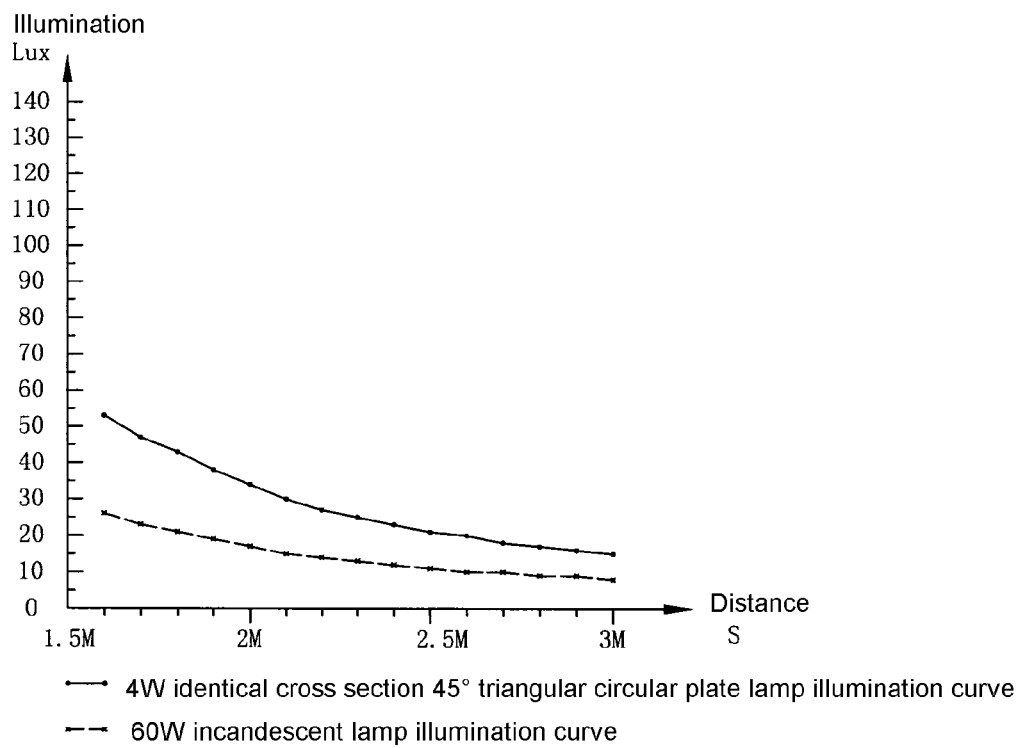
FIG. 13 is the curve graph comparing the luminance of the 4 w circular plate lamp of the present invention with 60 w incandescent lamps at 1.5-3 m distance.

Refer to FIGS. 12 and 13. These figures show the luminance curves of the 4 W circular plate lamp of the invention with the 60 W incandescent lamp at different distances, wherein the black dots and black connection lines are used to indicate the luminance of the 4 W circular plate lamp within certain distance and the grayish black dots and connection lines are used to indicate the luminance of the 60 W incandescent lamps within certain distance. Moreover, the vertex angle of the triangular prism body having identical cross section of the 4 W circular plate lamp is 45° (as shown in FIG. 3). Based on the test result, the luminance of 4 W circular plate lamp within 0.3-1.5 m can range from 1350 Lux to 70 Lux, while that for 60 W incandescent lamp within the same distance decreases from 800 Lux to below 70 Lux. The luminance of 4 W circular plate lamp within 1.5-3 m can be from 60 Lux to 20 Lux, while that for 60 W incandescent lamp within the same distance decreases from 30 Lux to 10 Lux. It can be seen that the oriented circular plate lamp with triangular prisms having identical cross sections and with LED of the invention can ensure preferable luminance, and in particular, the luminance at 3 m away from the circular plate lamp can even be 40 Lux. Therefore, the circular plate lamp can be used as a new lighting source so as to substitute the incandescent lamp, and have the advantages of energy conservation, high luminance, low heat dissipation, reasonable structure and easy use.

Figure 14:
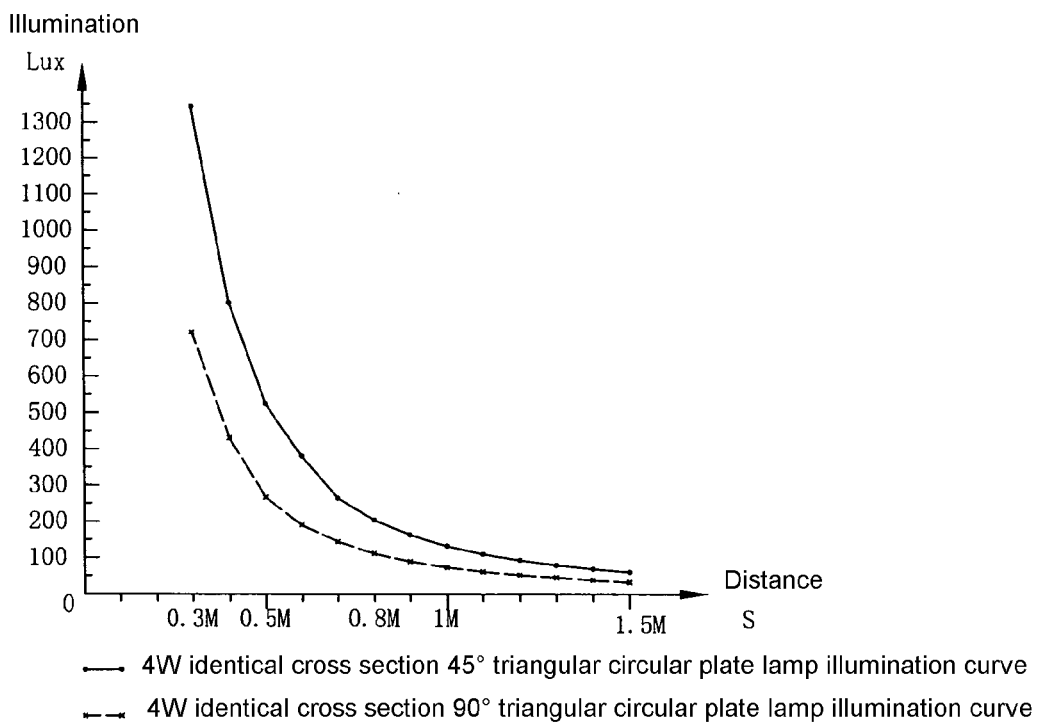
FIG. 14 is the curve graph comparing the luminance of the 4 w circular plate lamps with triangular prisms having identical cross section but having different shapes under present invention at 0-1.5 m distance.
Figure 15:
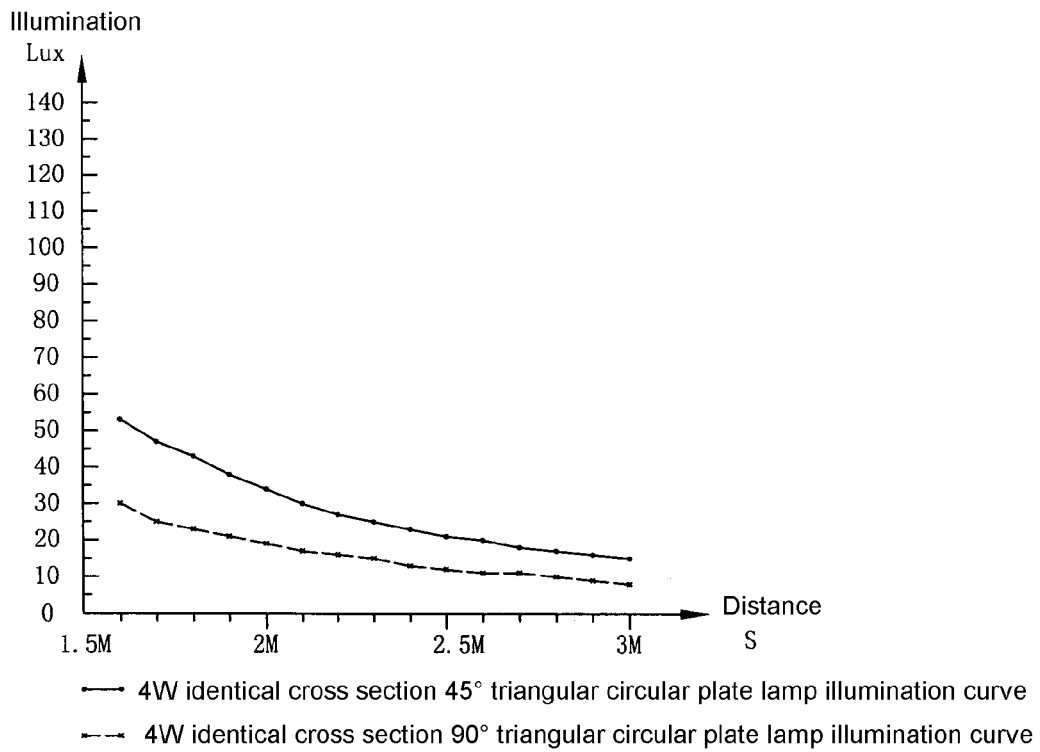
FIG. 15 is the curve graph comparing the luminance of the 4 w circular plate lamps with triangular prisms having identical cross section but having different shapes under present invention at 1.5-3 m distance.

FIG. 14 and FIG. 15 shows the luminance curves of the two different kinds of 4 W circular plate lamps of the invention with triangular prisms having identical cross section within 0.3-1.5 m and 1.5-3 m, wherein the black dots and black connection lines are used to indicate the luminance of 4 W circular plate lamp made of the light-reflecting plate with the vertex angle of the triangular prism body having identical cross section being 45° (as shown in FIG. 3) within certain distance and the grayish black dots and connection lines are used to indicate the luminance of 4 W circular plate lamp made of the light-reflecting plate with the vertex angle of the triangular prism body having identical cross section being 90° (as shown in FIG. 4) within certain distance.

Under the same power, the LED-equipped circular plate lamp with triangular prism body having identical cross section with the vertex angle of the prism body being 45° is compared with that with the vertex angle of the prism body being 90° in terms of luminance. From the curves shown in FIGS. 14 and 15, the luminance of the circular plate lamp with 45° vertex angle is larger than that with 90° vertex angle. In particular, the luminance of 4 W circular plate lamp with 45° vertex angle within 1.5-3 m almost doubles that with 90° vertex angle, the reason for which is that the marginal surfaces of the 4 W circular plate lamp having identical cross section with 45° vertex angle are just double of the marginal surfaces with 90° vertex angle. This also proves that the circular plate lamp of the invention is feasible in terms of the guiding principles for optical design.

Figure 17A:
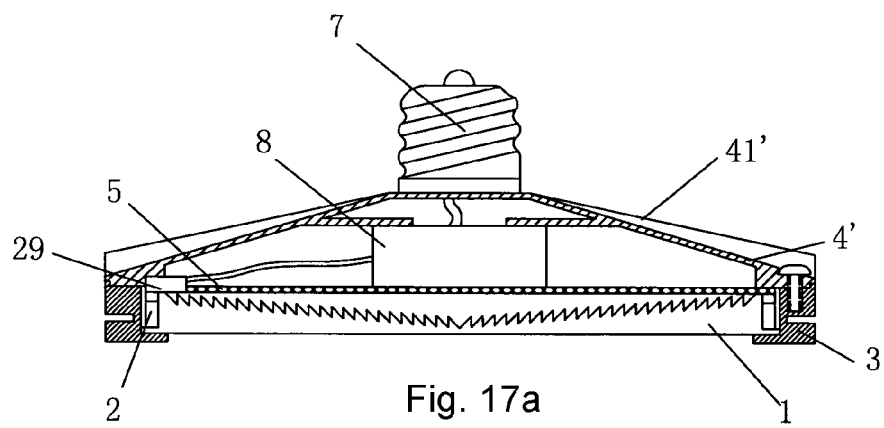
FIG. 17a and FIG. 17b are the sectional view and top view of the circular plate lighting fixtures with screw holder, respectively.
Figure 17B:
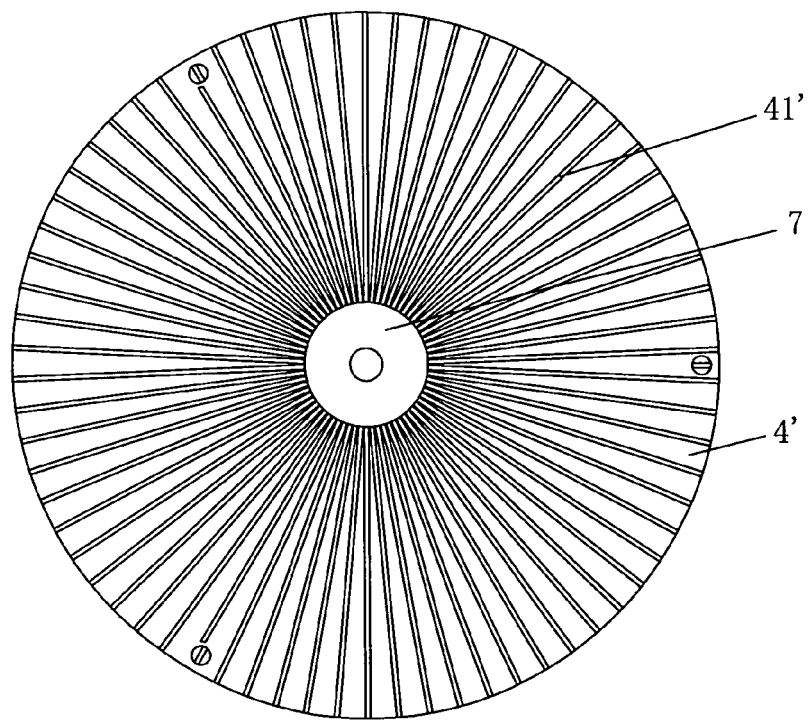

Please refer to FIG. 16. It can be understood that the circular plate lamp of the invention can be used as circular plate lighting fixture for all purposes by equipping with lamp socket, lamp holder, decorative lamp cover, and constant source of power driver like other bulbs or incandescent lamps. The circular plate lamp has simple structure and the oriented lighting fixture can have a 50-500 mm diameter. The embodiment for the circular plate lamp of the invention is a ceiling lamp. The centers of the heat-dissipating plate 4, reflecting back sheet 5 and light-reflecting plate are equipped with installation holes. Before the circular plate lamp is installed to the ceiling or flat top, a hole is made in advance on the flat top, into which a flat bar with screwed hole is installed to function as the support. Subsequently, a screw is pushed through the installation hole of the circular plate lamp and connected with the screw hole and then the circular plate lamp can be installed on the ceiling. Then, connect the terminal block 29 of the circular plate lamp with the constant current source of the power driver for external power supply to light up the LED bonding dies of the circular plate lamp, i.e. the strip-type LED lighting source so that the light beams emitted as mentioned before pass through the prism bodies and generate lamp light on the smooth surface. In another embodiment, the circular plate lamp of the invention can be made as energy-saving lamps with bayonet or screw sockets. For example, FIG. 17 shows a circular plate lamp with screw socket, wherein the circular plate lamp consists of light-reflecting plate 1, a plurality of lamp bodies 2, heat dissipating frame 3, heat-dissipating plate 4', reflecting back sheet 5, screw socket 7 and constant current source of power drive 8. From FIGS. 17a and 17b, it can be seen that some basic components of this circular plate lamp are the same with the embodiment illustrated before, except that the heat-dissipating plate 4' is different from the heat-dissipating plate 4 shown in FIG. 16, which is a conical cover plate, wherein the conical top is arranged on a flat surface and the conical surface is equipped with radiating heat-dissipating ribs 41'. The screw socket 7 is installed on the flat surface of the conical top. After the heat-dissipating plate 41' is covered on the light-reflecting plate 1 and the reflecting back sheet 5, its edge can be connected with the plate edge of the heat-dissipating frame 3 via the screw (not shown in the figure) to integrate the heat-dissipating plate 4' with the heat-dissipating frame 3. Meanwhile, a conical space is formed between the heat-dissipating plate 4' and the reflecting back sheet 5, wherein the constant current source for power drive 8 can be installed via the support (not shown in the figure), the input terminal of the later is connected with the screw socket 7 and the output terminal with the terminal block 29 of the LED strip-type lamp bodies 2 (not shown in the figure). Consequently, the circular plate lighting fixture is screwed into the screw socket 7 and connected with the lamp holder of the municipal power supply and then the lamp can be lit up accordingly.

The invention claimed is:

1. A circular plate lamp made of circular light-reflecting plate, said circular plate lamp comprising:
    a circular fight-reflecting plate with triangular oriented micro-prisms having identical cross section, wherein a plurality of concentric annular micro prism bodies are arranged on the prism surface of said light-reflecting plate in the radial direction starting from the central axial line, the cross section of each prism body is triangle and the prism bodies are continuously arranged in zigzag form in the vertical section through the central axial line, wherein said triangles have the same shape and the same cross sectional area; the apex of the triangle closest to the central axial line has the shortest distance away from the smooth surface of the light-reflecting plate, and the apices of the triangles towards the periphery of the light-reflecting plate have the successively increasing distances away from the smooth surface of the light-reflecting plate; the radial connection lines among the apices of the triangles of the circular prism bodies are two inclined straight lines, intersecting at a point with the central axial line of the circular light-reflecting plate and forming an inclusion angle α with the smooth surface of said plate, and the inclusion angle α is <45° and the distance or interval of all triangles is equal in the diameter direction;

a heat-dissipating frame; and a plurality of lamp bodies, wherein said heat-dissipating frame comprises a plate surface with a central throughhole and a circular plate edge around the plate surface, and the frame is sleeved around the light-reflecting plate so that the plate edge overlaps with the edge of the smooth surface of the light-reflecting plate, the lower part of the internal wall of the plate edge abuts with the flange of the light-reflecting plate, and the remaining part of the internal wall constitutes a gap with the cylindrical surface of the light-reflecting plate, thereby forming a circular lamp groove having the same axle with the central axle; said lamp bodies comprise LED, light bulbs, electrode tubes, or prefabricated LED assemblies having several LEDs, and are assembled in the circular lamp groove, respectively, wherein the emission plane of said LED intersects with the connection lines of the apices of said triangles and forms an inclusion angle of 90-α.

2. The circular plate lamp of claim 1, wherein the circular plate lamp further comprises heat-dissipating plate, wherein said heat-dissipating plate is a circular plate, the upper surface of which is arranged with a plurality of evenly-distributed and concentric circular heat-dissipating ribs perpendicular to the plate surface, and overlaps over the light-reflecting plate through the marginal part of said circular ribs with the plate edge of the heat-dissipating frame.

3. The circular plate lamp of claim 2, wherein the circular heat-dissipating ribs of the heat-dissipating plate have evenly-distributed gaps aligned in radial direction and said heat-dissipating plate is made of aluminum alloy.

4. The circular plate lamp of claim 1, wherein the circular plate lamp further comprises a reflecting back sheet, wherein said reflecting back sheet has almost the same dimensions with the light-reflecting plate, which can be made of plastic, paper or metal and is installed between the light-reflecting plate and the heat-dissipating plate.

5. The circular plate lamp of claim 1, wherein the lamp bodies are prefabricated circular lamp assemblies having a plurality of LED BONDING DIEs, resistor and circuit board and said lamp assemblies are bended into annular shape and are installed or embedded in said lamp groove so that the emission plane of LED installed inside the lamp groove is close to the cylindrical surface of the light-reflecting plate of the lamp groove and forms an inclusion angle of 90-α by intersecting with the connection lines of the apices of the triangles on the cross section of the light-reflecting plate.

6. The circular plate lamp of claim 1, wherein said heat-dissipating frame edge and its peripheral wall are arranged with several evenly distributed annular heat-dissipating ribs in the radial direction.

7. The circular plate lamp of claim 1, wherein the side of the triangles where said triangular prism body radiates towards or the side adjacent to the light is the light-receiving side and also the marginal side where the triangle faces towards the central axis, and the circular surface where the light-receiving marginal side is located is the light-receiving marginal surface, wherein the extension line of the marginal side intersects with the smooth surface of the prism surface and forms an inclusion angle with the normal line thereof, ranging from 40°-90°.

8. The circular plate lamp of claim 1, wherein the main axle of said LED ray is a beam of light parallel to the smooth surface of the circular light-reflecting plate and facing towards the central axis; when there are n triangular prism bodies alongside the central axis of the circular light-reflecting plate and the emitting plane of each LED has area A, then said emitting area A is divided into n divisions wherein n equals to the quantities of the prism bodies; if the total photon energy provided is E, then the sufficient photon energy distributed to each equal area division is E/A/n so that the emitting light from LED sheds radially and evenly on the light-receiving marginal side of any triangular cross section or the light-receiving surface of the triangular prism bodies in the direction of the central axis.

9. The circular plate lamp of claim 1, wherein said LED and LED BONDING DIE are dioxides and chips with low power and current, and several chips are installed inside a LED BONDING DIE.

10. The circular plate lamp of claim 1, wherein it further comprises a terminal block and said circular light-reflecting plate has a receptacle arranged respectively on the edge of the inside of the lamp groove, wherein said terminal block is installed in the receptacle and cable connected with the leading wires of the circular lamp assemblies.

11. The circular plate lamp of claim 1, wherein said heat-dissipating frame and heat-dissipating plate are made of aluminum alloy.

12. The circular plate lamp of claim 1, wherein each of the heat-dissipating plate, the reflecting back sheet and the light-reflecting plate is arranged with a central installation hole in the center.

13. The circular plate lamp of claim 1, wherein it further comprises a screw socket and a constant current power supply, wherein said heat-dissipating plate is of conical shape, the apex of which is arranged on a plane and on the conical face of which are arranged with radial heat-dissipating ribs; said screw socket is installed on the plane of the conical apex; said constant current power supply is installed between the heat-dissipating plate and the reflecting back sheet by a support, the input terminal of which is connected with the screw socket and the output terminal is connected with the terminal block of the LED strip light source.

14. The circular plate lamp of claim 1, wherein the apices of said continuously zigzag-formed triangles have successively decreasing distance from the smooth surface, and the extension line of the marginal side, which is either of the right side and the left side of the triangles, intersects with the smooth surface relative to the prism surface and forms an inclusion angle with the normal line thereof, ranging from 40° to 90°.

15. The circular plate lamp of claim 1, wherein said inclusion angle α is less than 10°.

16. The circular plate lamp of claim 1, wherein said light-reflecting plate has periphery surrounded by cylindrical surface outside the circular micro prism body farthest to the central axle and said cylindrical surface has flange arranged at the place adjacent to the smooth surface.

17. The circular plate lamp of claim 1, wherein said triangles are right-angle or non-right-angle triangles.

18. The circular plate lamp of claim 17, wherein said transparent plastic is polycarbonate.

19. The circular plate lamp of claim 1, wherein said circular light-reflecting plate is made of transparent plastic.

* * * * *